United States Patent [19]
Ishida et al.

[11] Patent Number: 5,536,180
[45] Date of Patent: Jul. 16, 1996

[54] PC CARD ELECTRICAL CONNECTOR WITH EXPANDABLE EJECTOR

[75] Inventors: Mitsuo Ishida; Shoichi Tomioka, both of Tokyo, Japan

[73] Assignee: Hirose Electric Co., Ltd., Tokyo, Japan

[21] Appl. No.: 375,478

[22] Filed: Jan. 19, 1995

[30]   Foreign Application Priority Data

Sep. 27, 1994 [JP] Japan ................................. 6-256141

[51] Int. Cl.⁶ .................................................. H01R 13/62
[52] U.S. Cl. ................................... 439/159; 439/157
[58] Field of Search ................................. 439/152–160, 439/372

[56]   References Cited

U.S. PATENT DOCUMENTS

| | | | |
|---|---|---|---|
| 4,821,147 | 4/1989 | Jacobs et al. | 439/153 |
| 5,275,573 | 1/1994 | McCleerey | 439/153 |
| 5,414,594 | 5/1995 | Hristake | 439/153 |

*Primary Examiner*—David L. Pirlot
*Attorney, Agent, or Firm*—Kanesaka & Takeuchi

[57]   ABSTRACT

A PC card electrical connector with an expandable ejector includes an intermediate bar (10) having a cam follower pin (13); an ejector button section (20) for motion between a lock position (A2) where the ejector button section projects little more than a front end of the casing and a release position (C2) where the ejector button section projects far from the front end of the casing; a line spring (28) having a cam follower end (30); a first biasing spring (30) for biasing the ejector button section forwardly so that when the ejector button section is depressed a first time to release the follower end of the line spring from the lock position, the ejector button section is brought to the release position; and a second biasing spring (49) for biasing the intermediate bar onto a side of the ejector button section so that when the ejector button section is moved forward to the release position, the intermediate bar is turned to connect to the ejector button section, thereby making it possible that by depressing a second time the ejector button section to move the intermediate bar rearwardly, the receiving plate is brought to the removing position for removal of the PC card.

5 Claims, 7 Drawing Sheets

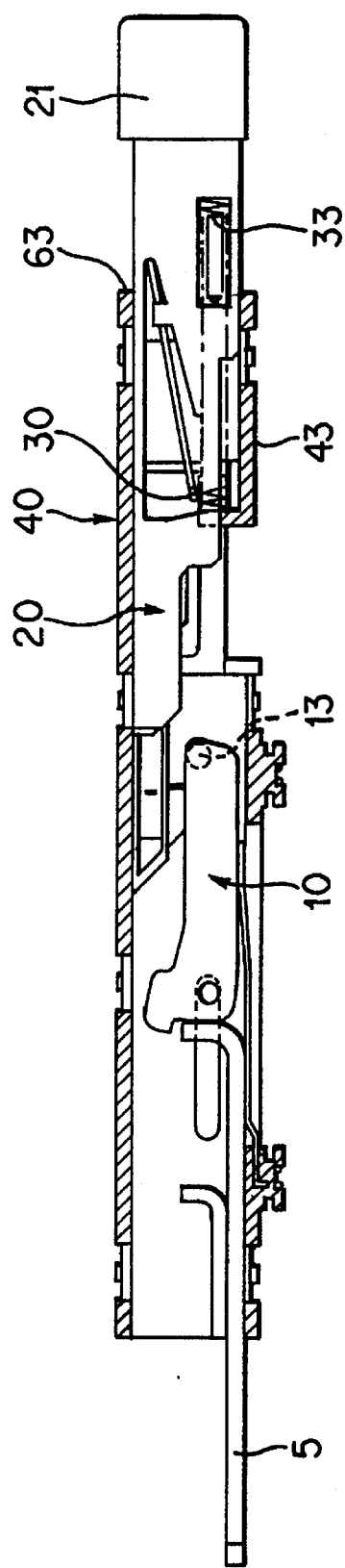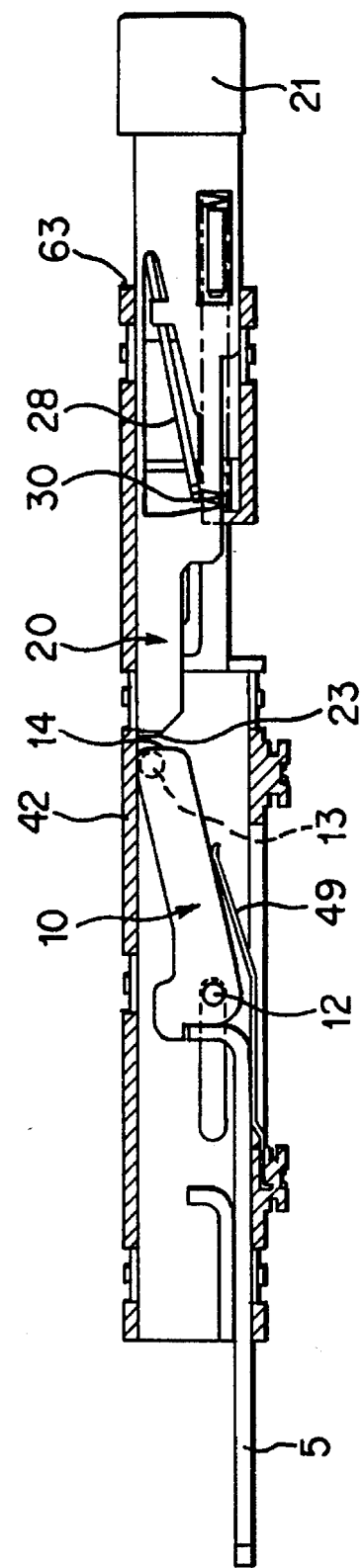
FIG. 5
FIG. 6

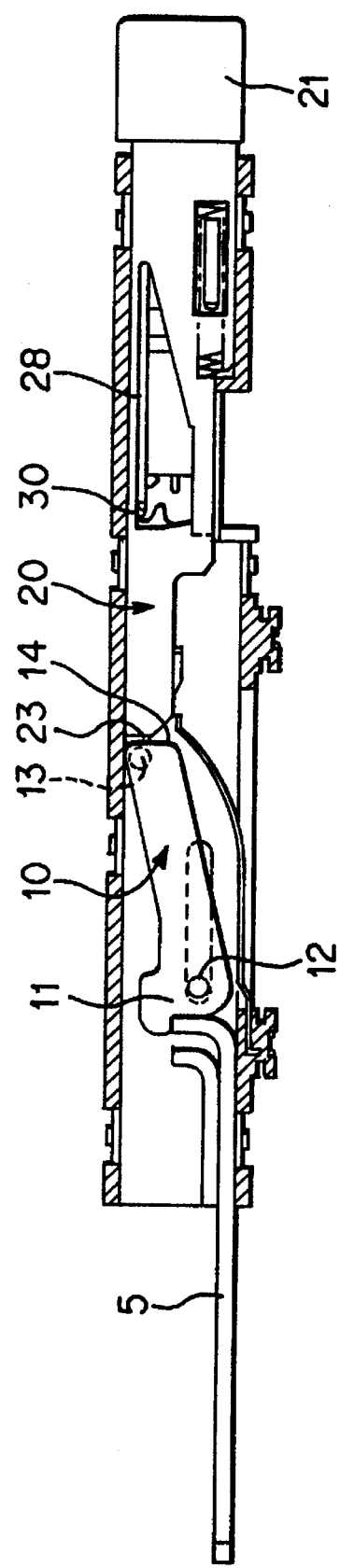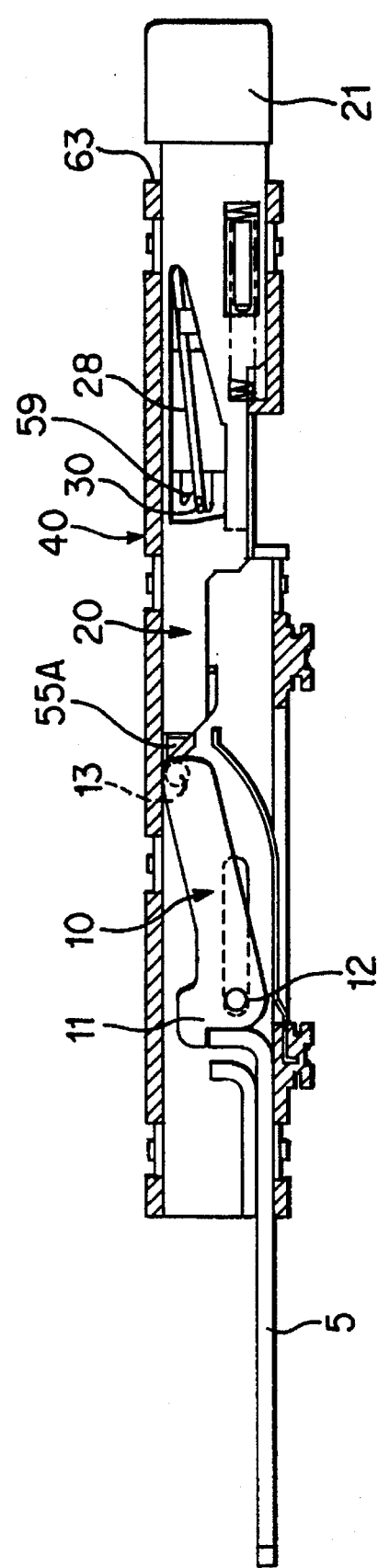
FIG. 7
FIG. 8

5,536,180

PC CARD ELECTRICAL CONNECTOR WITH EXPANDABLE EJECTOR

BACKGROUND OF THE INVENTION

1. Field of the Invention

The present invention relates to electrical connectors for personal computer (PC) cards.

2. Description of the Related Art

FIG. 10 shows a PC card electrical connector such as shown in Japanese UM patent application Kokai No. 4-133369. The electrical connector includes a housing 81 having a receiving cavity 83 for receiving a PC card 82. A receiving plate 84 is provided at the rear portion of the cavity 83 for receiving the front portion of the PC card 82. The receiving plate 84 has an abutment portion 85 for abutment against the front end of the PC card 82 and a slot 86 for receiving a stud 87, which extends upwardly from the bottom of the cavity 83, to support an ejector lever 88 for rotation. The ejector lever 88 has at an end portion a slot 89 for receiving a projection 90 of the receiving plate 84. The other end portion of the ejector lever 88 extends beyond a side of the cavity 83 and is connected in a groove 91A to an ejector bar 91 which is movable in the direction parallel to the side of the cavity 83. The ejector bar 92 is connected to an ejector button 92 which is provided near the opening or front end of the cavity 83 for ejector operation. The ejector button 92 is located near the rear end of the PC card 82 which is received in the cavity 83.

In order to remove the PC card, the ejector button 92 is pushed rearwardly up to the position shown by a broken line (refer to an arrow A) to turn the ejector lever 88 counterclockwise, thereby moving the receiving plate 84 forwardly so that the abutment portion 85 pushes the PC card 82 forwardly, thus making it possible to remove the PC card 82.

When the PC card 82 is placed in the cavity 83, the ejector button 92 projects no more than the rear end of the PC card 82 so that it is difficult to push the ejector button 92 or too easy not to push both the ejector button 92 and the PC card 82.

Where the ejector button is made to project more than the rear end of the PC card for facilitating the ejection operation, it is possible to inadvertently push the ejector button so that the PC card pops out during the use.

SUMMARY OF THE INVENTION

Accordingly, it is an object of the invention to provide a PC card electrical connector with an ejector button which projects only when the PC card is removed, thereby preventing the operation error.

According to the invention there is provided a PC card electrical connector with an expandable ejector, which includes a housing having a receiving cavity therein; a receiving unit provided in the receiving cavity and is movable between a rearward receiving position wherein a PC card is pushed in the receiving cavity and a forward removing position wherein the PC card is removable from the receiving cavity; a casing secured to a side of the housing and having a bottom on which first and second cam channels and a guiding slot are formed; an ejector bar provided in the casing and linked to the receiving means at a rear end thereof; an intermediate bar provided in the casing so as to contact the ejector bar at a rear end thereof and having, near the rear end, a shaft for sliding engagement with the guiding slot and, at lower front portion, a cam follower pin for sliding engagement with the second cam channel; an ejector button section provided in the casing for motion between a lock position where a front end portion of the ejector button section projects little more than a front end of the casing and a release position where the front end portion of the ejector button section projects far from the front end of the casing; a spring member extending rearwardly from a middle portion of the ejector button section and having a rear cam follower end for sliding engagement with the first cam channel to thereby hold the ejector button section at the lock position when the receiving unit is at the receiving position; a first biasing member provided between the ejector button section and the casing for biasing the ejector button section forwardly so that when the front end portion of the ejector button section is depressed first time to release the follower end of the spring member from the lock position, the ejector button section is brought forwardly to the release position; and a second biasing member provided between the intermediate bar and the casing for biasing the intermediate bar onto a side of the ejector button section so that when the ejector button section is moved forward to the release position and separated from the intermediate bar, the intermediate bar is turned about the shaft so that a front end of the intermediate bar is connected to a rear end of the ejector button section, thereby making it possible that by depressing second time the front end of the ejector button section against the first biasing member to move the intermediate bar and the ejector bar rearwardly, the receiving unit is brought to the removing position for removal of the PC card.

A PC card is inserted into and removed from the PC card electrical connector with an expandable ejector according to the invention as follows:

(1) A PC card is inserted into the receiving cavity of the housing. The PC card pushes the receiving unit rearwardly, which in turn pushes the ejector bar forwardly. At this point, the intermediate bar is biased on a side of the ejector button section, and the cam follower end of the spring member is at the lock position. Consequently, the ejector button section is kept at the rearwardly depressed lock position while the PC card is used.

(2) To remove the PC card, the ejector button section is pushed first time to release the follower end from the lock position. When the first push is released, the first bias member pushes the released ejector button section forwardly so that the ejector button section projects far from the front end of the casing and the rear end of the received PC card.

(3) When the ejector button section is moved forwardly, the second bias member turns the intermediate bar about the shaft so that the front end of the intermediate bar is opposed to the rear end of the ejector button section.

(4) Then, the ejector button section is pushed second time against the first bias member to move the intermediate bar and the ejector bar rearwardly.

(5) The ejector bar in turn moves the receiving unit forwardly so that the PC card is now removable. The ejector button section is kept at the lock position because the follower end of the spring member engages the first cam channel at the lock position so that the ejector button section projects no more than the front end of the casing.

The above and other objects, features, and advantages of the invention will be more apparent from the following description when taken in conjunction with the accompanying drawings.

BRIEF DESCRIPTION OF THE DRAWINGS

FIGS. 3–8 are longitudinal sections of the electrical connector, showing how a PC card is inserted or removed;

DESCRIPTION OF THE PREFERRED EMBODIMENT

Figure 1:
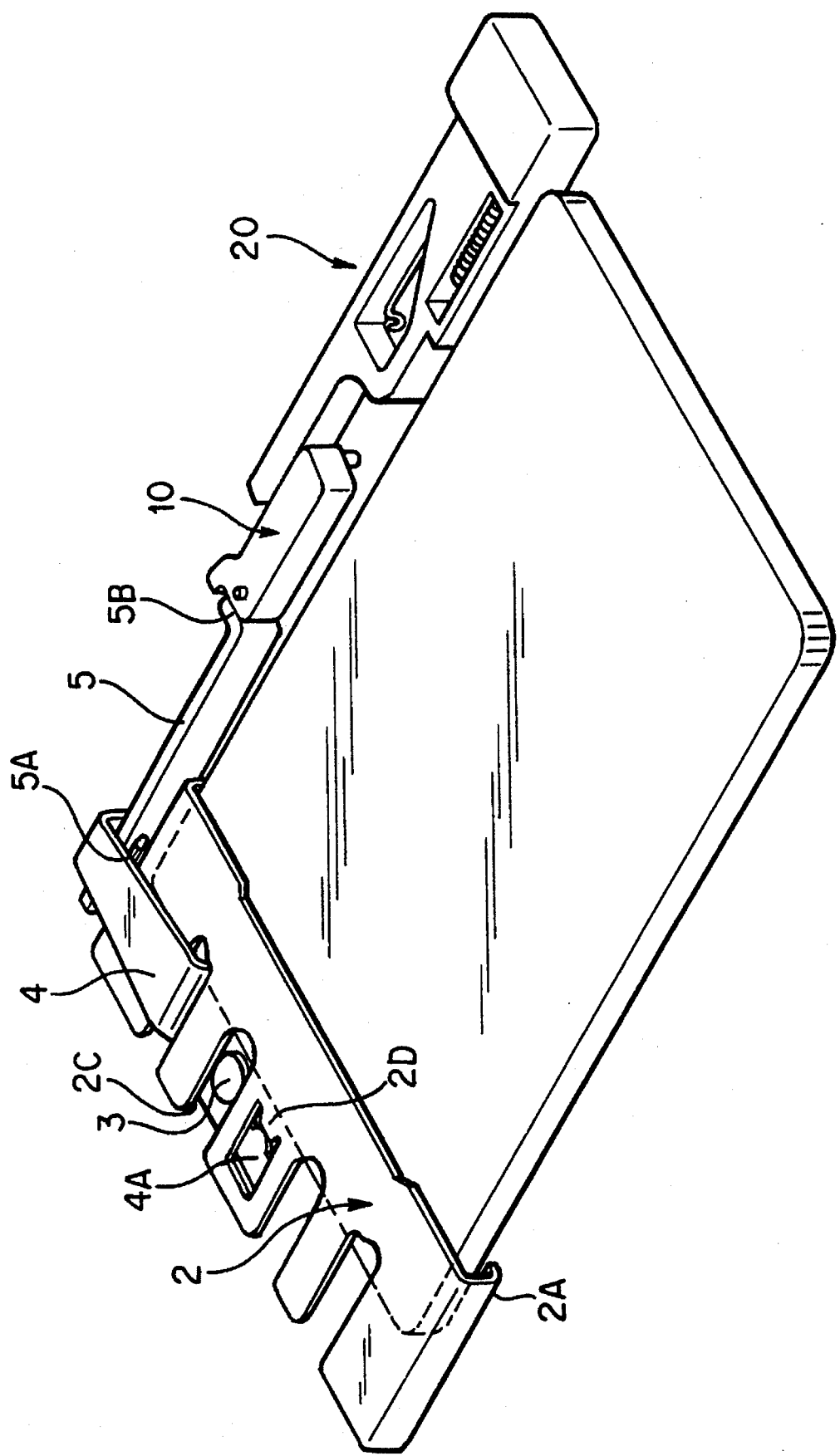
FIG. 1 is a perspective view of a PC card electrical connector according to an embodiment of the invention.

FIG. 1 shows a PC card and an ejector mechanism for receiving and ejecting the PC card.

In FIG. 1, the front portion of a PC card 1 is received in a receiving plate 2 of a transmission mechanism which consists of the receiving plate 2, a stud 3, an ejector lever 4, and an ejector bar 5. The receiving plate 2 has on opposite sides a pair of L-shaped guide portions 2A for guiding insertion of the PC card 1 and is movable in the cavity of a housing in the direction parallel to the guide portions 2A. A recess 2C extends forwardly from the rear edge of the receiving plate 2 to receive the stud 3 which extends upwardly from the bottom of the housing.

The ejector lever 4 is supported by the stud 3 for rotation and has a semi-circular work point 4A abutted against an abutment point 2D of the receiving plate 2. The other end of the ejector lever 4 is bent downwardly in a U-shaped form for engagement with a slot 5A of the ejector bar 5 and serves as an effort point.

The ejector bar 5 extends forwardly and has an L-shaped front portion 5B.

An intermediate bar 10 and an ejector button section 20 are provided in front of the ejector bar 5.

Figure 2:
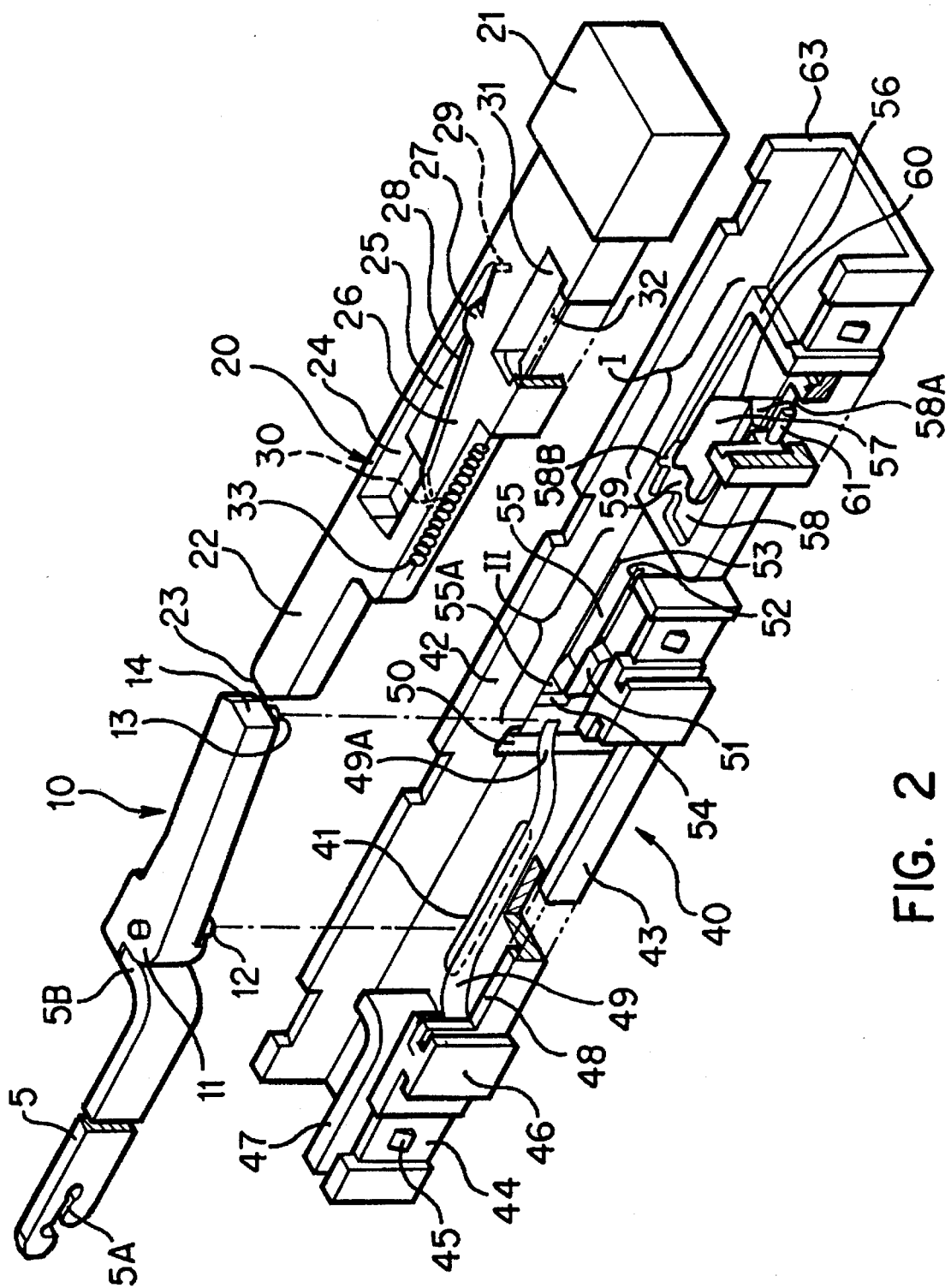
FIG. 2 is a perspective view of an ejector mechanism for the electrical connector.

In FIG. 2, the intermediate bar 10 has a stepped abutment portion 11 for abutment against the front portion 5B of the ejector bar 5 and a shaft portion 12 for sliding engagement with a guide slot 41 provided on the bottom of a case 40 which is a part of the housing so that it is not only rotatable about the shaft portion 12 but also movable straight within the range of the slot 41. Also, it has a cam follower pin 13 extending downwardly from the lower front portion and a bearing surface 14 on the front end.

The ejector button section 20 has a push button 21 on the front end and a reduced arm portion 22 toward the rear end. The reduced arm portion 22 extends along a side wall 42 of the case 40 and defines a space between a side wall 43 and itself. An abutment surface 23 is provided at the rear end of the arm portion 22 for abutment against the bearing surface 14 of the intermediate bar 10.

The middle portion of the ejector button section 20 has a width smaller than the distance between the side walls 42 and 43 so as to provide a space between the side wall 43 and the ejector button section 20. The middle portion has an opening 24 and a depression 25 in front of the opening 24. The depression 25 has an inclined side wall 26 with a downwardly extending hold member 27. A line spring 28 made by bending opposite ends of a length of spring wire is provided within the depression 25. Alternatively, the line spring 28 may be a leaf spring or any other appropriate form of spring. The front end 29 of the line spring 28 is bent downwardly into the ejector button section 20 for fastening while the rear end is bent in a U-shaped form at the back of the depression 25, forming a cam follower end 30. Consequently, the line spring 28 is flexible laterally about the front end 29 and vertically at the rear follower end 30, but the holder member 27 not only restricts the extent of flexibility in both the directions but also biases the line spring 28 toward the side wall 43.

A recess 31 with a opening at the rear portion thereof is provided in the ejector button section 20 in front of the opening 24 along the side wall 43. A spring support 32 extends rearwardly from the front wall of the recess 31, and a compression spring 33 is fitted over the spring support 32.

The case 40 has a U-shaped cross section for receiving the ejector bar 5, the intermediate bar 10, and the ejector button section 20. The side walls 42 and 43 have on their outer surfaces depressed portions 44 with a projection 45 for engagement with the holes in side walls of a cover (not shown) to close the case 40 after the ejector bar 5, the intermediate bar 10, and the ejector button section 20 are placed.

Connection members 46 having a T-shaped cross section are provided on the outer surfaces of the side walls 42 and 43 for engagement into grooves in a side wall of the housing to thereby connect the case 40 to the housing as a unit. If the grooves are provided on the other side wall, too, it is possible to connect the case 40 to the other side wall of a housing by turning it upside down.

An L-shaped wall 43 is provided on the rear portion of the case 40 to cooperate with the side wall 43 for guiding the ejector bar 5 between them.

A cutout 48 is provided in the side wall 43 extending between the rear and middle portions, and the rear end of a fine leaf spring 49 is fastened to the rear edge of the cutout 48. The front end 49A of the leaf spring 49 is bent inwardly so as to touch a side face of the intermediate bar 10. Consequently, the intermediate bar 10 is biased to turn counterclockwise about the shaft 12.

A second cam section II is provided on the middle bottom of the case 40. A guiding ridge 50 is provided on the rear boundary of the second cam section II crossing obliquely the intermediate bar 10 between the shaft 12 and the follower pin 13 for guiding the follower pin 13. In front of the guiding ridge 50 there is provided a cam island 51 having a rear end face parallel to the guiding ridge 50. Between the cam island 51 and the side wall 42 there is provided a pair of slits 52 and 53 which communicate with each other via a linking slit 54, forming a cantilevered finger member 55. The rear end face of the finger member 55 is aligned with the rear end face of the cam island 51. The rear portion of the finger member 55 is raised obliquely upwardly and then flat horizontally. Thus, around the cam island 51 there is provided a cam channel for guiding the follower pin 13 of the intermediate bar 10. The follower pin 13 is movable rearwardly along the finger member 55 but is kept from moving forwardly by the raised front portion 55A and guided toward the cam island 51 against the leaf spring 49.

Figure 9:
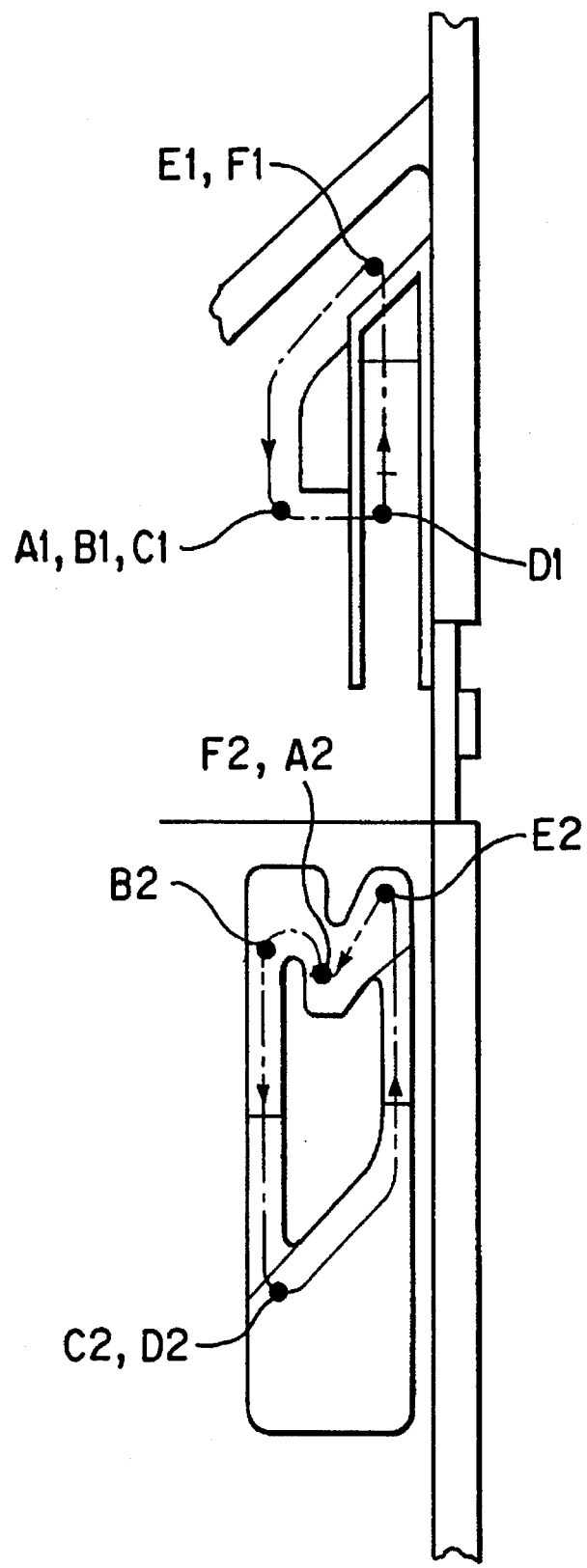
FIG. 9 is a plan view of first and second cam sections of the ejector mechanism.
Figure 10:
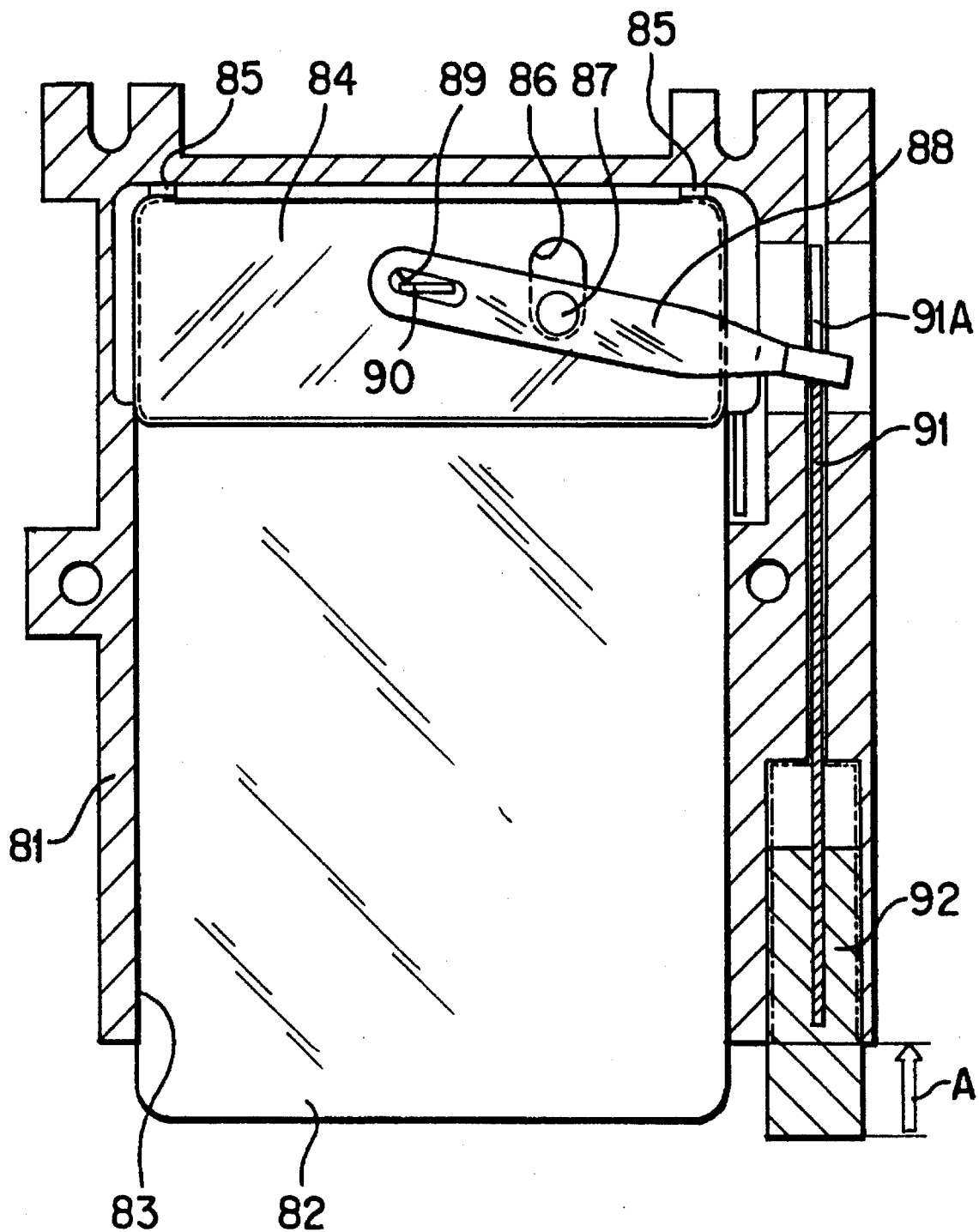
FIG. 10 is a longitudinal section of a conventional electrical connector.

In front of the second cam section II there is provided a first cam section I which includes a stepped-up base 56 and a substantially heart-shaped cam island 57 in the base 56, forming a cam channel 58 therearound. The cam channel 58 has at the rear end a concave portion 59 along the cam island 57 and at the front end an extended area. The cam island 57 has a front end face 60 extending obliquely rearwardly toward the side wall 42. The follower end 30 of the line spring 28 slidably engages with the cam channel 58, in which there are provided saw-tooth shaped shoulders 58A and 58B at the front and rear ends of the cam island 57 so that the follower end 30 of the line spring 28 can moves only counterclockwise in the cam channel 58 as shown in FIG. 9.

In the first cam section I there is provided a spring support 61 extending forwardly in the same line as the axial line of the spring support 32 so that the compression spring 33 is held between the spring supports 32 and 61 for biasing the ejector button section 20 forwardly.

The operation of the ejector will be described below with reference to FIGS. 3–9. In FIGS. 3–8, the ejector bar 5, the immediate bar 10, and the ejector button section 20 are shown in the case 40, with the side walls 42 and 43 cut longitudinally. In FIG. 9, the traces of the follower pin 13 of the intermediate bar 10 and the follower end 30 of the line spring 28 are shown in the second and first cam sections II and I, respectively.

Figure 3:
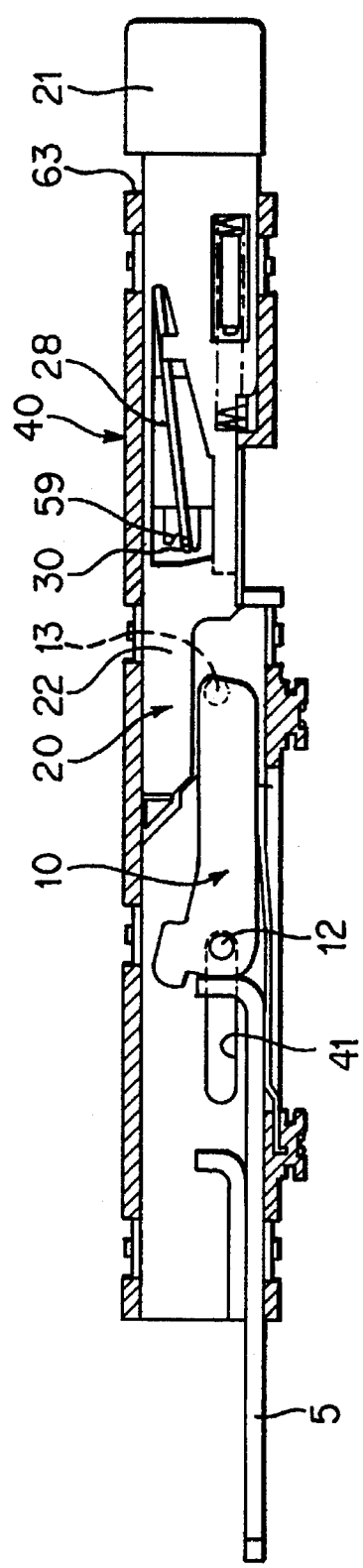

(1) As shown in FIG. 1, the PC card 1 is put into the receiving cavity of the housing (not shown). The receiving plate 2 is pushed rearwardly by the PC card 1, which in turn pushes the work point 4A of the ejector lever 4 to turn clockwise the ejector lever 4 about the fulcrum 3. The ejector lever 4, which is linked at the other end with the ejector bar 5, moves the ejector bar 5 forwardly. Then, the ejector bar 5 moves the intermediate bar 10 forwardly, with the shaft 12 sliding along the slot 41 as shown in FIG. 3. This brings the follower pin 13 to the middle position of the arm portion 22 of the ejector button section 20, which is at the depressed position in which the push button 21 is depressed close to the front end 63 of the case 40. This position of the follower pin 13 is shown at A1 in FIG. 9. The follower end 30 of the line spring 28 rests in the concave portion 59 of the cam channel 58 to lock the ejector button section 20 to the depressed position. This position of the follower end 30 is shown at A2 in FIG. 9.

Figure 4:
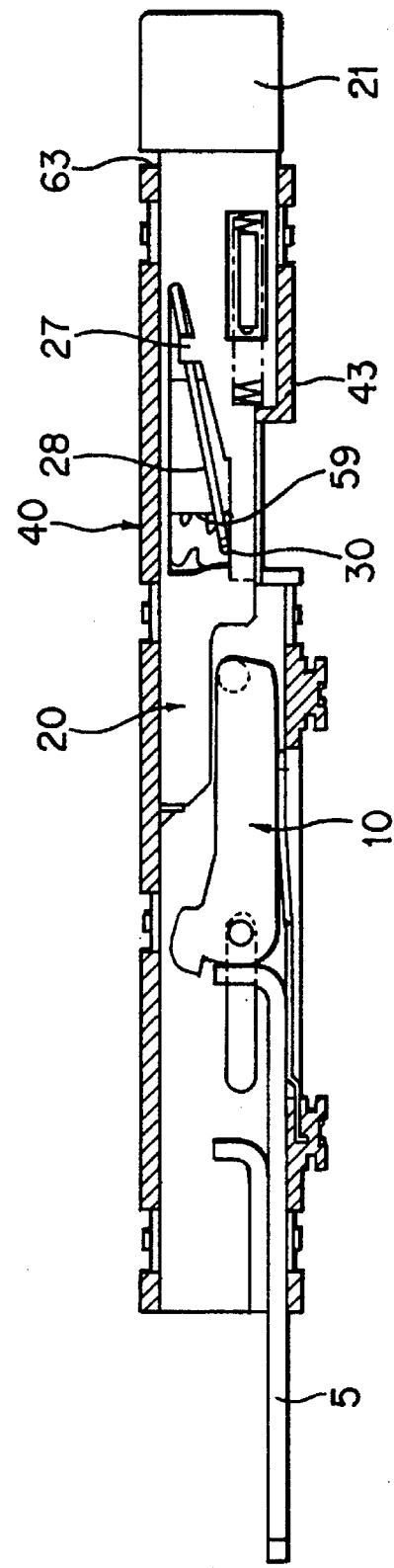

(2) To remove the PC card 1, it is necessary to release the follower end 30 from the lock condition. When the push button 21 is pushed (first push), the follower end 30 is moved rearwardly toward the side wall 43 as shown in FIG. 4 because the line spring 28 is biased by the holder member 27 toward the side wall 43. This position of the follower end 30 is shown at B2 in FIG. 9. The intermediate bar 10 remains at the same position so that the follower pin 13 is at the same position or B1 in FIG. 9.

(3) When the first push is released, the ejector button section 20 is moved forwardly by the compression spring 33 as shown in FIG. 5, bringing the push button 21 to a release position in which the push button 21 is projected far from the front end 63 of the case 40. The follower pin 13 of the intermediate bar 10 remains at the same position or C1 while the follower end 30 of the line spring 28, which is fastened to the ejector button section 20, is brought forwardly past the shoulder 58A to the position C2 in FIG. 9.

(4) When the front portion of the intermediate bar 10 is separated from the arm portion 22 of the ejector button section 20, the intermediate bar 10 is turned counterclockwise toward the side wall 42 by the leaf spring 49 as shown in FIG. 6 so that the bearing surface 14 of the intermediate bar 10 is opposed to the pressure face 23 of the ejector button section 20. This position of the follower pin 13 is shown at D1 in FIG. 9. The follower end 30 of the line spring 28 remains at the same position or D2.

(5) When the push button 21 is pushed again (second push) to depress the ejector button section 20 as shown in FIG. 7, the follower end 30 of the line spring 28 is brought to the position E2 from D2 past the front end face 60 of the cam island 57 and the shoulder 58A. The ejector button section 20 pushes the intermediate bar 10 so that the follower pin 13 is brought to the position E1 from D1. The intermediate bar 10 then pushes the ejector bar 5 rearwardly, which turns the ejector lever 4 counterclockwise about the fulcrum 3, moving the receiving plate 2 and thus the PC card 1 forwardly.

(6) When the second push is released, the follower end 30 of the line spring 28 is guided by the guide shoulder 58B into and locked in the concave portion 59 of the cam island 57 or brought to the position F2 which is the same position as A2 in FIG. 9. Thus, the push button 21 of the ejector button section 20 is held at the lock position which projects little more than the case 40 as shown in FIG. 8. The follower pin 13 of the intermediate bar 10 is kept and locked at the same position or F1 by the rear portion 55A of the finger member 55.

Alternatively, the transmission mechanism consisting of the receiving plate 2, the fulcrum 3, the ejector lever 4, and the ejector bar 5 may be modified. For example, an L-shaped lever or cam member may be used to receive a force from the ejector bar 5 or directly from the intermediate bar 10 at one end for rotation and exert the force upon the PC card on the other end.

As has been described above, in the electrical connector according to the invention, the ejector button is retracted normally and protruded only temporarily for removing the PC card so that the accidental push of the ejector button is minimized. In addition, the ejector button is protruded to a large extent for removal of the PC card, it is easy to depress the push button. Moreover, the ejector mechanism has a relatively simple structure.

We claim:

1. A PC card electrical connector with an expandable ejector, comprising:

a housing having a receiving cavity therein;

receiving means provided in said receiving cavity and being movable between a rearward receiving position wherein a PC card is pushed in said receiving cavity and a forward removing position wherein said PC card is removable from said receiving cavity;

a casing secured to a side of said housing and having a bottom on which first and second cam channels and a guiding slot are formed;

an ejector bar provided in said casing and linked to said receiving means at a rear end thereof;

an intermediate bar provided in said casing so as to contact said ejector bar at a rear end thereof and having, near said rear end, a shaft for sliding engagement with said guiding slot and, at a lower front portion, a cam follower pin for sliding engagement with said second cam channel;

an ejector button section provided in said casing for motion between a lock position where a front end portion of said ejector button section projects little more than a front end of said casing and a release position where said front end portion of said ejector button section projects far from said front end of said casing;

first spring means extending rearwardly from a middle portion of said ejector button section and having a rear cam follower end for sliding engagement with said first cam channel to thereby hold said ejector button section at said lock position when said receiving means is at said receiving position;

first biasing means provided between said ejector button section and said casing for biasing said ejector button section forwardly so that when said front end portion of said ejector button section is depressed a first time to release said follower end of said spring means from said lock position, said ejector button section is brought forwardly to said release position; and second biasing means provided between said intermediate bar and said casing for biasing said intermediate bar onto a side of said ejector button section so that when said ejector button sections is moved forward to said release position and separated from said intermediate bar, said intermediate bar is turned about said shaft past said ejector button section so that a front end of said intermediate bar is connected to a rear end of said ejector button section, thereby making it possible that by depressing a second time said front end of said ejector button section against said first biasing means to move said intermediate bar and said ejector bar rearwardly, said receiving means is brought to said removing position for removal of said PC card.

2. A PC card electrical connector with an expandable ejector according to claim 1, wherein said receiving means comprises:

a receiving plate for receiving a front portion of said PC card and movable between said receiving and removing positions; and an ejector lever having a rear end in contact with said receiving plate and a front end in contact with a rear end of said ejector bar so that when said ejector bar is moved rearwardly, said ejector lever moves said receiving plate forwardly.

3. A PC card electrical connector with an expandable ejector according to claim 1, wherein said spring means comprises a length spring wire having a front end secured to said ejector button section and a rear end is bent in a U-shaped form, forming said cam follower end.

4. A PC card electrical connector with an expandable ejector according to claim 1, wherein said first biasing means comprises a coil spring normally compressed between said casing and said ejector button section so that when said ejector button section is released from said lock position, said coil spring pushes said ejector button section forwardly with respect to said casing.

5. A PC card electrical connector with an expandable ejector according to claim 1, wherein said second biasing means comprises a leaf spring having a rear end secured to said casing and a front end bent toward said ejector button section so as to press said intermediate bar on said ejector button section.

* * * * *